United States Patent [19]

Kotani et al.

[11] Patent Number: 5,754,580
[45] Date of Patent: May 19, 1998

[54] CARBON DIOXIDE GAS LASER OSCILLATION APPARATUS

[75] Inventors: Hiroyuki Kotani, Osaka; Naoki Urai, Soraku-gun; Tetsuji Akaki, Settsu; Tamotsu Ueno, Osaka, all of Japan

[73] Assignee: Daihen Corporation, Osaka, Japan

[21] Appl. No.: 728,214

[22] Filed: Oct. 10, 1996

[51] Int. Cl.$^6$ .................................................. H01S 3/038
[52] U.S. Cl. .......................... 372/61; 372/33; 372/38; 372/87
[58] Field of Search ........................ 372/33, 38, 55, 372/57, 58, 61, 81–88

[56] References Cited

U.S. PATENT DOCUMENTS

| | | | |
|---|---|---|---|
| 3,662,284 | 5/1972 | Beaulieu et al. | 372/83 |
| 4,601,039 | 7/1986 | Sze | 372/83 |
| 4,722,086 | 1/1988 | Koseki | 372/33 |
| 5,295,149 | 3/1994 | Terai et al. | 372/38 X |
| 5,408,490 | 4/1995 | Terai et al. | 372/87 |

FOREIGN PATENT DOCUMENTS

| | | |
|---|---|---|
| 59-18699 | 5/1984 | Japan . |
| 6-45676 | 2/1994 | Japan . |
| 7-7164 | 1/1995 | Japan . |
| 7-38190 | 2/1995 | Japan . |
| 8-64888 | 3/1996 | Japan . |
| 8-288572 | 11/1996 | Japan . |

*Primary Examiner*—John D. Lee
*Attorney, Agent, or Firm*—Scully, Scott, Murphy & Presser

[57] ABSTRACT

A carbon dioxide gas laser oscillation apparatus having one or more discharge tubes each having a pair of anode and cathode electrodes at least one of which is non-grounded and one or more high voltage DC power sources each connected between the pair of electrodes of each discharge tube provides with one or more conductors each being arranged on each discharge tube in the vicinity of the non-grounded electrode of the pair of electrodes but on one side of the non-grounded electrode opposite to a space between the pair of electrodes. The $CO_2$ gas laser oscillation apparatus further provides with one or more current detection circuit for detecting a current flowing between zero-potential terminal and ground terminal of the high voltage DC power source, thereby enabling to detect an abnormal discharge within each discharge tube.

7 Claims, 8 Drawing Sheets

5,754,580

1

CARBON DIOXIDE GAS LASER OSCILLATION APPARATUS

BACKGROUND OF THE INVENTION

1. Field of the Invention

The present invention relates to a carbon dioxide gas laser oscillation apparatus which is designed not to develop abnormal discharging and prevent parts from being damaged even in the occurrence of abnormal discharging in a compact structure with a long service life.

2. Description of the Prior Art

In spite of its excellent performance owing to characteristic features of a carbon dioxide gas laser, a carbon dioxide gas laser processor is not widely used because the apparatus is not only bulky and expensive, but requires a large installation space. To facilitate a wide application of the apparatus necessitates a compact and inexpensive structure, and for this aim, a carbon dioxide gas laser oscillation apparatus and a power source device for a laser oscillator are to be primarily improved among the parts of the apparatus. However, the carbon dioxide gas laser oscillation apparatus is restricted in size to effectively prevent abnormal discharging, in other words, cannot be freely downsized. On the other hand, the power source device for the oscillator is allowed a limited capacity to accommodate parts therein to secure necessary outputs and maintain the stability of oscillation.

FIG. 1 is an electric circuit diagram of a conventional carbon dioxide gas laser oscillation apparatus equipped with a laser oscillator LG and two high voltage DC power sources F1 and F2 for the laser oscillator.

The power sources F1 and F2 in FIG. 1 use the same parts except a discharging current value setting circuit IR which is shared between F1 and F2 and therefore, the function of the high voltage DC power sources F1 will now be described below.

Referring to FIG. 1, a low voltage rectifier circuit RL, having an input from a commercial power source PS, rectifies and smooths the input thereby to output a low DC voltage. An inverter circuit INV converts the DC output rectified/smoothed at the rectifier circuit RL to a high frequency voltage. A high voltage transformer HT converts the voltage output from the inverter circuit INV to a high voltage. High voltage rectifier circuits RH1 and RH2 rectify outputs of secondary windings HTa and HTb of the high voltage transformer HT respectively. A plus output terminal 11 of the high voltage rectifier circuit RH1 is connected to an anode electrode A1 of a discharge tube B1, and a minus output terminal 12 of the high voltage rectifier circuit RH2 is connected to a cathode electrode K1 of the discharge tube B1. A connection point 7 (referred to as a zero-potential terminal hereinbelow) between a minus output terminal of the high voltage rectifier circuit RH1 and a plus output terminal of the high voltage rectifier circuit RH2 is grounded.

A discharging current value detection circuit ID detects a value of a discharging current and outputs a discharging current value detection signal Id. The discharging current value setting circuit IR sets a value of the discharging current and outputs a discharging current value setting signal Ir. A discharging current value comparison circuit CP, having inputs of the discharging current value detection signal Id and the discharging current value setting signal Ir, outputs a difference of the signals as a discharging current value comparison signal Cp. Upon receipt of the discharging

2 current value comparison signal Cp, an inverter control circuit IC outputs an inverter control signal Ic for controlling the inverter circuit INV.

The above parts from an input terminal 1 of the low voltage rectifier circuit RL to output terminals 11 and 12 of the high voltage rectifier circuits RH1 and RH2 constitute the first high DC power source F1. Similarly, parts from the input terminal 1 of the low voltage rectifier circuit RL to output terminals 13 and 14 of the high voltage rectifier circuits RH1 and RH2 constitute the second high DC power source F2.

The first and second DC high power sources F1 and F2 form the power source device for the laser oscillator LG consisting of discharge tubes B1 and B2. The laser oscillator LG and the first and second D.C. power sources F1 and F2 constitute a carbon dioxide gas laser oscillation apparatus to be described later with reference to FIG. 2.

FIG. 2 shows the conventional carbon dioxide gas laser oscillation apparatus provided with the laser oscillator LG and a laser gas feed device for the laser oscillator.

The discharge tube B1 having an anode electrode A1 and a cathode electrode K1 thereinside discharges at a discharge area L1 between the anode electrode A1 and cathode electrode K1. The discharge tube B2 alike discharges at a discharge area L2 defined therein between an anode electrode A2 and a cathode electrode K2.

In FIG. 2, these anode electrodes A1, A2 and cathode electrodes K1 and K2 (referred to respectively as electrodes A1, A2, K1 and K2 hereinafter) are not grounded.

The output terminals 11–14 of the high voltage DC power sources F1 and F2 are connected between the anode electrode A1 and cathode electrode K1 and between the anode electrode A2 and cathode electrode K2. The zero-potential terminal 7 at a middle point of the output terminals in each power source is earthed so as to decrease a potential difference between each electrode and the ground.

A reflecting mirror M is set at one end of the discharge tube B1. An output mirror N is attached at one end of the discharge tube B2, through which a laser light P is output. A blower H circulates a laser gas composed of $CO_2$, $N_2$ and He. A second heat exchanger J2 cools the laser gas passing through the blower H, while a first heat exchanger J1 cools the laser gas circulated through laser 10 feed pipes V1, V2, discharge areas L1, L2 and a return pipe D. References Q1–Q6 indicate flow passages for the laser gas.

In FIG. 2, the laser gas is supplied from a gas feed device (not shown) to the discharge tubes B1 and B2 after the air, residual gas, etc. inside the discharge tubes B1 and B2 are let out by the vacuum pump G. The high voltage DC power sources F1 and F2 apply a DC high voltage to the corresponding pairs of electrodes A1 and K1 and, A2 and K2. This DC high voltage generates glow discharge at the discharge areas L1 and L2. The laser light resulting from the glow discharge reciprocates between the reflecting mirror M and output mirror N, and a part of the laser light, i.e., laser light P is output from the output mirror N.

Prior Art 1

In the carbon dioxide gas laser oscillation apparatus shown in FIG. 2, the potential of the anode electrode A1 or A2 to the earthing potential is generally plus 10 kv or larger. When the anode electrode A1 or A2 is rod-shaped, an inclination of the potential in the vicinity of the anode electrode A1 or A2 is larger than that of a flat electrode. Therefore, if the distance between the anode electrode A2 and the output mirror N attached to an oscillator case GC which is at the earthing potential is short, abnormal discharging is easy to occur between the anode electrode A2 and metal fittings of the output mirror N through the laser gas.

In the same manner, if the anode electrode A1 is separated short from the reflecting mirror M at the oscillator case GC, abnormal discharging is prone to take place between the anode electrode A1 and metal fittings of the reflecting mirror M through the laser gas.

The abnormal discharging brought about as above between the anode electrode A2 and metal fittings of the output mirror N or between the anode electrode A1 and metal fittings of the reflecting mirror M damages the output mirror N or reflecting mirror M, which makes it impossible to obtain the normal laser light P.

In general, the potential of the cathode electrodes K1 and K2 to the earthing potential is not smaller than minus 10 kV. When the cathode electrode K1 or K2 is a rod electrode, an inclination of the potential near the cathode electrode K1 or K2 is larger than that of a flat electrode. As such, if the cathode electrode K1 or K2 is not separated enough from the first heat exchanger J1 at the oscillator case GC, abnormal discharging is likely to take place between the cathode electrode K1 or K2 and the first heat exchanger J1 through the laser gas. The abnormal discharging deteriorates efficiency of the laser oscillation apparatus, because part of the power supplied from the high voltage DC power source F1 or F2 is consumed at the return pipe D not contributing to the laser oscillation.

For avoiding the above abnormal discharging, in the conventional carbon dioxide gas laser oscillation apparatus, the distances of the anode electrode A2 and output mirror N and of the anode electrode A1 and reflecting mirror M are unavoidably set long. At the same time, the distance between the cathode electrode K1 or K2 and the first heat exchanger J1 should be long, whereby the return pipe D becomes lengthy as well.

In accordance with an increase of the distance between the anode electrode A2 and output mirror N, between the anode electrode A1 and reflecting mirror M or between the cathode electrode K1 or K2 and first heat exchanger J1, the laser gas present in the distance absorbs more of the laser light, and consequently the laser light P output from the output mirror N is decreased.

Prior Art 2

For the laser oscillation, the air, residual gas, etc. in the discharge tube B1 is first sent outside, then the laser gas is supplied into the discharge tube B1 and a high voltage is impressed between the anode electrode A1 and cathode electrode K1, whereby discharging in started between the anode electrode A1 and cathode electrode K1. However, if more or less moisture adheres to the interior of the discharge tube B1, it may cause abnormal discharging outside the discharge area L1 between the anode electrode A1 and cathode electrode K1, specifically, between the anode electrode A1 and oscillator case GC of the earthing potential or between the cathode electrode K1 and oscillator case GC.

In the event of abnormal discharging generated as above, discharging in the discharge tube B1 becomes instable. If the discharging is continued nevertheless, the discharge tube B1, reflecting mirror M, output mirror N, laser gas feed part, discharge tube supporting part, etc. are affected by the abnormal discharging and damaged. Moreover, if it is highly humid in the oscillator case GC, a leak current flows between the anode electrode A1 and oscillator case GC, between the cathode electrode K1 and oscillator case GC and between a high voltage section and a low voltage section, etc., thereby damaging the parts. Other devices are also sometimes damaged by a leaking high voltage.

Prior Art 3

The conventional carbon dioxide gas laser oscillation apparatus of FIG. 1 requires the inverter circuit INV for each of the discharge tubes B1 and B2. In addition, each of the discharging current value detection circuit ID, discharging current value comparison circuit CP and inverter control circuit IC is required by the same number as that of the discharge tubes. Therefore, the power source for the laser oscillator is disadvantageously large in size and expensive.

SUMMARY OF THE INVENTION

The object of the present invention is therefore substantially to provide a carbon dioxide gas laser oscillation apparatus adapted to solve the above-described problems inherent in the prior arts individually or totally.

More specifically, an object of the present invention is to provide a carbon dioxide gas laser oscillation apparatus which can surely prevent abnormal discharging between an electrode and metal fittings of each mirror or a heat exchanger.

A further object of the present invention is to provide a carbon dioxide gas laser oscillation apparatus which can surely stop outputs when an abnormal current, e.g., an abnormal discharging current between an anode electrode and an oscillator case or a leak current flowing in the oscillator case, etc. is generated.

A still object of the present invention is to provide a carbon dioxide gas laser oscillation apparatus which can supply electricity to a plurality of discharge tubes with the use of a single inverter circuit.

In order to accomplish the aforementioned objects, a carbon dioxide gas laser oscillation apparatus according to the present invention is provided with a discharge tube having a pair of an anode electrode and a cathode electrode at least one of which is non-grounded and a high voltage DC power source connected to the pair of the electrodes, wherein at least one conductor is arranged on the discharge tube in the vicinity of the non-grounded electrode but on one side of the non-grounded electrode opposite to a space between the pair of electrodes.

With the conductors arranged as above, an inclination of the potential in the vicinity outside of each electrode is reduced, so that possible abnormal discharging is surely prevented. However, it is more preferable to set a safety device in preparation for the abnormal discharging.

A current detection circuit may be installed between a zero-potential terminal and an earthing terminal of the high voltage DC power source to shut off a power source itself when the abnormal current is detected.

In the carbon dioxide gas laser oscillation apparatus of this type, in many cases, discharge tubes are connected in series to obtain high outputs.

In that case, since the cost is increased if a high voltage power source is arranged for every individual discharge tube, it is preferable to drive the discharge tubes as small a number of circuits as possible. For this purpose, therefore, the carbon dioxide gas laser oscillation apparatus according to a preferred embodiment of the present invention is provided with a plurality of discharge tubes connected in series, each discharge tube having a pair of an anode electrode and a cathode electrode at least one of which is non-grounded, conductors each arranged on each discharge tube in the vicinity of the non-grounded electrode but on one side of the non-grounded electrode opposite to a space between the pair of electrodes a low voltage rectifier circuit for rectifying/smoothing an input from a commercial power source, an inverter circuit for converting an output of the low voltage rectifier circuit to an AC, high voltage transformers of the same count as that of the plurality of discharge tubes, and high voltage rectifier circuits which connect primary sides of the plurality of high voltage transformers in series, connect the series-connected primary sides to the inverter circuit, and rectify outputs of secondary sides of the high voltage transformers, so that outputs of the high voltage rectifier circuits are supplied to the plurality of discharge tubes.

When a count of discharge tubes connected is large, the discharge tubes may be separated in groups and a common high voltage power source is provided to be shared in each group.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

In a carbon oxide gas laser oscillation apparatus according to the present invention, a high voltage DC power source is connected between a pair of an anode electrode and a cathode electrode, and conductors are arranged in the periphery of either one or both of non-grounded electrodes of the pair in the outer periphery of the discharge tube except an interval of the electrodes and, connected to the non-grounded electrodes.

[Embodiment 1]

Figure 3:
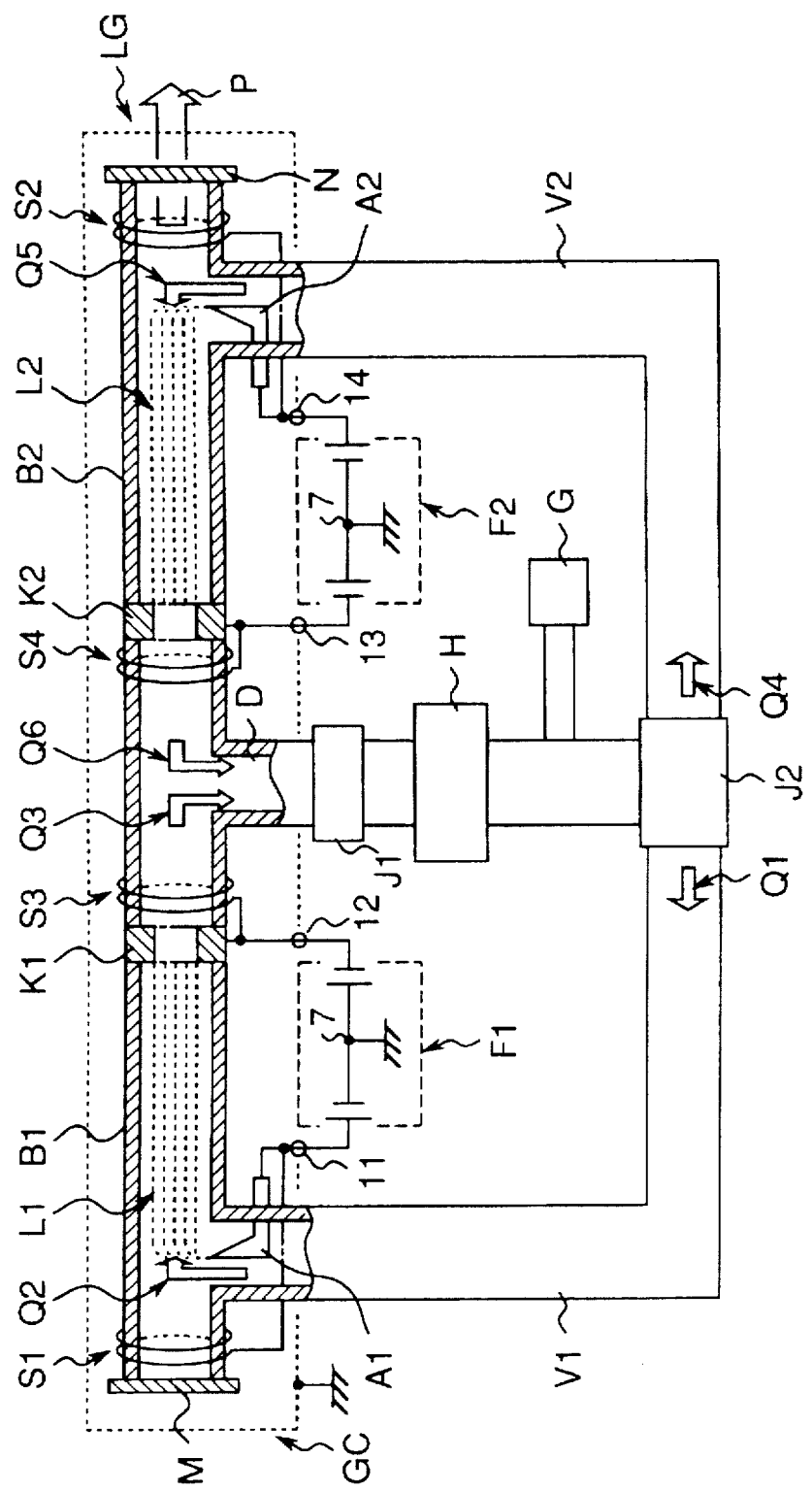
FIG. 3 is a diagram of a carbon dioxide gas laser oscillation apparatus according to a first embodiment of the present invention, which is equipped with abnormal discharging prevention conductors.

FIG. 3 indicates a carbon dioxide gas laser oscillation apparatus including abnormal discharging prevention conductors according to Embodiment 1 of the present invention.

Figure 1:
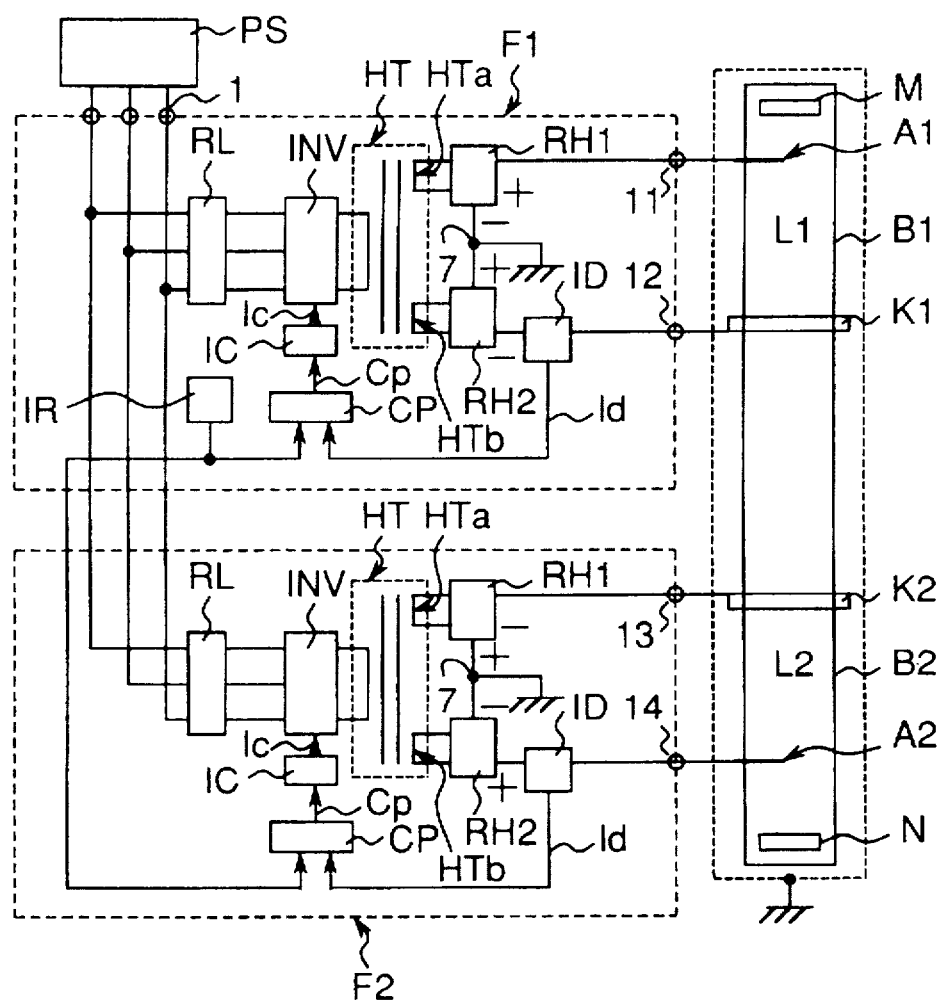
FIG. 1 is an electric circuit diagram of a conventional carbon dioxide gas laser oscillation apparatus provided with a laser oscillator LG and high voltage DC power sources F1 and F2 for the laser oscillator.

In FIG. 3, since parts designated by the same reference numerals as in FIG. 1 function in the same way, only differences will be depicted here, with the detailed description being abbreviated. Electrodes A1, A2, K1 and K2 in FIG. 3 are non-grounded electrodes, similar to FIG. 2.

Referring to FIG. 3, a conductor S1 connected to the anode electrode A1 is wound in the outer periphery of the discharge tube BE near the anode electrode A1 excluding an interval between the pair of the anode electrode A1 and cathode electrode K1. Similarly, a conductor S3 connected to the cathode electrode K1 is wound in the outer periphery of the discharge tube B1 near the cathode electrode K1 except the interval of the pairing anode electrode A1 and cathode electrode K1.

A conductor S2 connected to the anode electrode A2 is wound in the outer periphery of the discharge tube B2 near the anode electrode A2 except an interval between the anode electrode A2 and cathode electrode K2 in a pair. A conductor S4 connected to the cathode electrode K2 is wound in the outer periphery of the discharge tube B2 near the cathode electrode K2 except the interval of the pair of the anode and cathode electrodes A2 and K2.

In the embodiment of the present invention indicated in FIG. 3, the potential of the anode electrode A1 or A2 to the earthing potential is not smaller than +10 kV as in the conventional device. However, when the conductors are connected to the anode electrode A1 or A2 as shown in the drawing, an inclination of the potential of the anode electrode A1 or A2 in the vicinity outside of the respective discharge area L1 or L2 becomes smaller than in the conventional device in FIG. 1. Consequently, abnormal discharging is harder to happen, as compared with the conventional device, between the anode electrode A1 and metal fittings of the reflecting mirror M at the oscillator case GC or between the anode electrode A2 and metal fittings of the output mirror N at the oscillator case GC.

While the potential of the cathode electrode K1 or K2 to the earthing potential is not smaller than −10 kV, similar to the conventional device, if the conductors are connected to the cathode electrode K1 or K2 as illustrated, an inclination of the potential of the cathode electrode K1 or K2 in the vicinity outside of the respective discharge area L1 or L2 is reduced more in comparison with the conventional device. Therefore, abnormal discharging between the cathode electrode K1 or K2 and the first heat exchanger J1 in the oscillator case GC is far less brought about.

One ends of the conductors S1–S4 are connected to the electrodes A1, A2, K1 and K2 as mentioned earlier. The other ends of the conductors may be connected to nowhere or connected with the one ends, that is, each conductor may be formed in the shape of a ring. Alternatively, the conductors S1–S4 may not be wound around the discharge tubes B1 and B2, but may be simply arranged adjacently to the discharge tubes B1 and B2 in a manner not to be turned around the discharge tubes.

[Embodiment 2]

Figure 4:
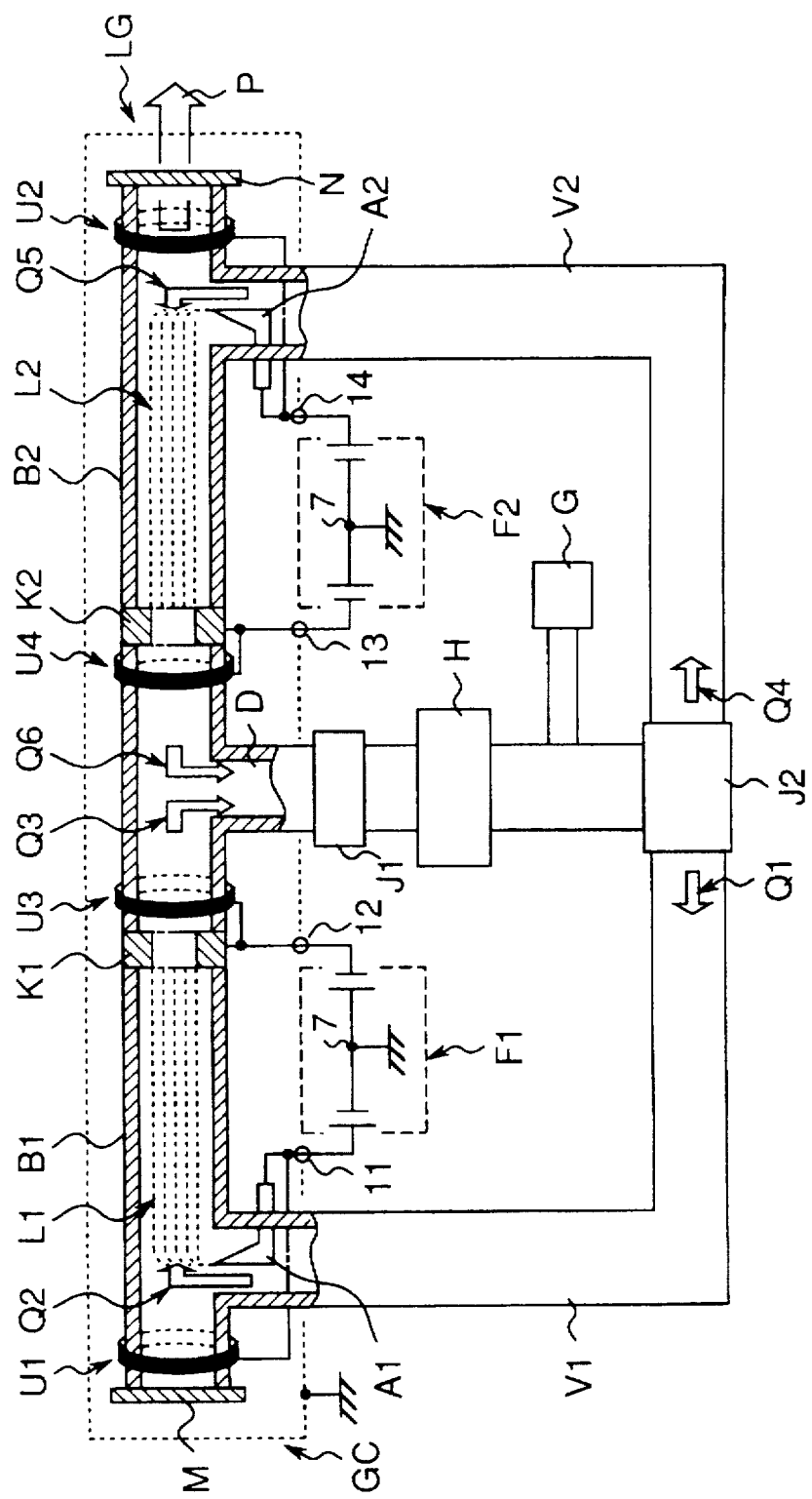
FIG. 4 is a diagram of a carbon dioxide gas laser oscillation apparatus according to a second embodiment of the present invention, which is equipped with belt-like abnormal discharging prevention conductors.

FIG. 4 shows a second embodiment of the present invention, specifically, a carbon dioxide gas laser oscillation apparatus provided with belt-like abnormal discharging prevention conductors.

Parts of FIG. 4 denoted by the same reference numerals as those of FIG. 1 function the same way, and therefore the description will be abbreviated and only differences from FIG. 1 will be discussed. In FIG. 4, electrodes A1, A2, K1, and K2 are non-grounded electrodes as in FIG. 1.

In FIG. 4, a band-shaped or belt-like conductor U1 connected to the anode electrode A1 is fixed in the outer periphery of the discharge tube B1 near the anode electrode A1 except an interval between the pair of the anode electrode A1 and cathode electrode K1. Likewise, a band-shaped conductor U3 connected to the cathode electrode K1 is fixed in the outer periphery of the discharge tube B1 around the cathode electrode K1 except the interval of the pair of the anode electrode A1 and cathode electrode K1.

A band-shaped conductor U2 connected to the anode electrode A2 and a band-shaped conductor U4 connected to the cathode electrode K2 are also fixed in the outer periphery of the discharge tube B2 near the anode electrode A2 and the cathode electrode K2 except an interval of the pair of the anode electrode A2 and cathode electrode K2, respectively.

The above band-shaped conductors are enough to be considerably small of a diameter corresponding to the outer diameter of the corresponding discharge tubes, e.g., 5 mm wide and 0.5 mm thick.

In the embodiment of FIG. 4, the potential of the anode electrode A1 or A2 to the earthing potential is, similar to the conventional device, +10 kV or larger. If the band-shaped conductors are fixed to the anode electrode A1 or A2 as indicated in FIG. 4, an inclination of the potential in the vicinity outside of the discharge area L1 or L2 of the anode electrode A1 or A2 becomes smaller than that of the conventional device of FIG. 1.

As a result, abnormal discharging between the anode electrode A1 and metal fittings of the reflecting mirror M attached to the oscillator case GC at the earthing potential or between the anode electrode A2 and metal fittings of the output mirror N of the oscillator case GC is much less generated than in the prior arts.

The same goes true for the cathode electrode K1 or K2. The potential of the cathode electrode K1 or K2 to the earthing potential is not smaller than −10 kV, as in the conventional device. However, if the band-shaped conductors are fixed to the cathode electrode K1 or K2 as shown in the drawing, an inclination of the potential of the cathode electrode K1 or K2 in the vicinity outside of the discharge area L1 or L2 becomes smaller than in the conventional device, so that abnormal discharging between the cathode electrode K1 or K2 and the first heat exchanger J1 set to the oscillator case GC is further prevented than in the conventional device.

In Embodiment 2 of FIG. 4 described hereinabove, each of the band-shaped conductors U1–U4 may not necessarily be a closed ring, but may be an open conductor.

Although two discharge tubes are set in the foregoing Embodiments 1 and 2, the present invention is similarly applicable even if one or, three or more discharge tubes are employed.

According to Embodiments 1 and 2 in FIGS. 3 and 4, the middle point of output terminals in each high voltage DC power source F1, F2 is earthed as shown in FIGS. 3 and 4 so as to keep the electrodes A1, A2, K1 and K2 at a plus and a minus potentials to the earthing potential. If any of the output terminals 11–14 of the high voltage DC power sources F1 and F2 is grounded, abnormal discharging is not given rise to at the grounded electrode, so that no conductor is needed in the periphery of the grounded electrode and the conductor should be connected only in the periphery of a non-grounded electrode or an electrode of a different potential from the earthing potential.

[Embodiment 3]

Figure 5:
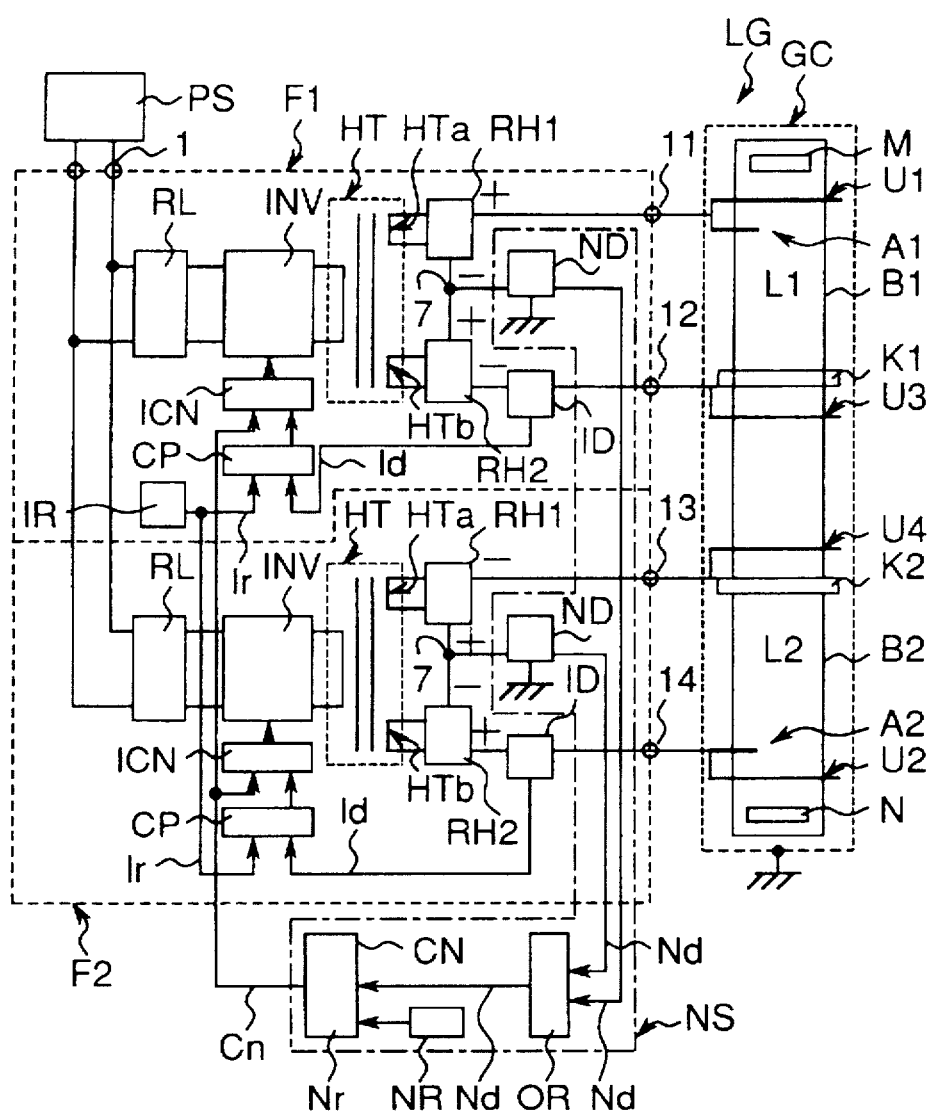
FIG. 5 is a diagram of a carbon dioxide gas laser oscillation apparatus according to a third embodiment of the present invention, which is provided with a laser oscillator LG with belt-like abnormal discharging prevention conductors, an abnormal discharging-judging/output-stopping circuit NS and high voltage DC power sources F1 and F2.

FIG. 5 is a diagram of a carbon dioxide gas laser oscillation apparatus according to Embodiment 3 of the present invention, which is provided with a laser oscillator LG with belt-like abnormal discharging prevention conductors, an abnormal discharging-judging/output-stopping circuit NS and high voltage DC power sources F1 and F2.

Any of the anode and cathode electrodes in FIG. 5 is not grounded, similar to FIG. 1. Belt-like conductors U1 and U3 connected to the anode electrode A1 and cathode electrode K1 are fixed in the periphery of the discharge tube B1 near the anode electrode A1 and the cathode electrode K1 except the interval of the anode electrode A1 and cathode electrode K1, respectively, similar to FIG. 4. Moreover, belt-like conductors U2 and U4 connected to the anode electrode A2 and cathode electrode K2 are fixed in the outer periphery of the anode electrode A2 and the cathode electrode K2 excluding the interval of the anode electrode A2 and cathode electrode K2, respectively.

Figure 2:
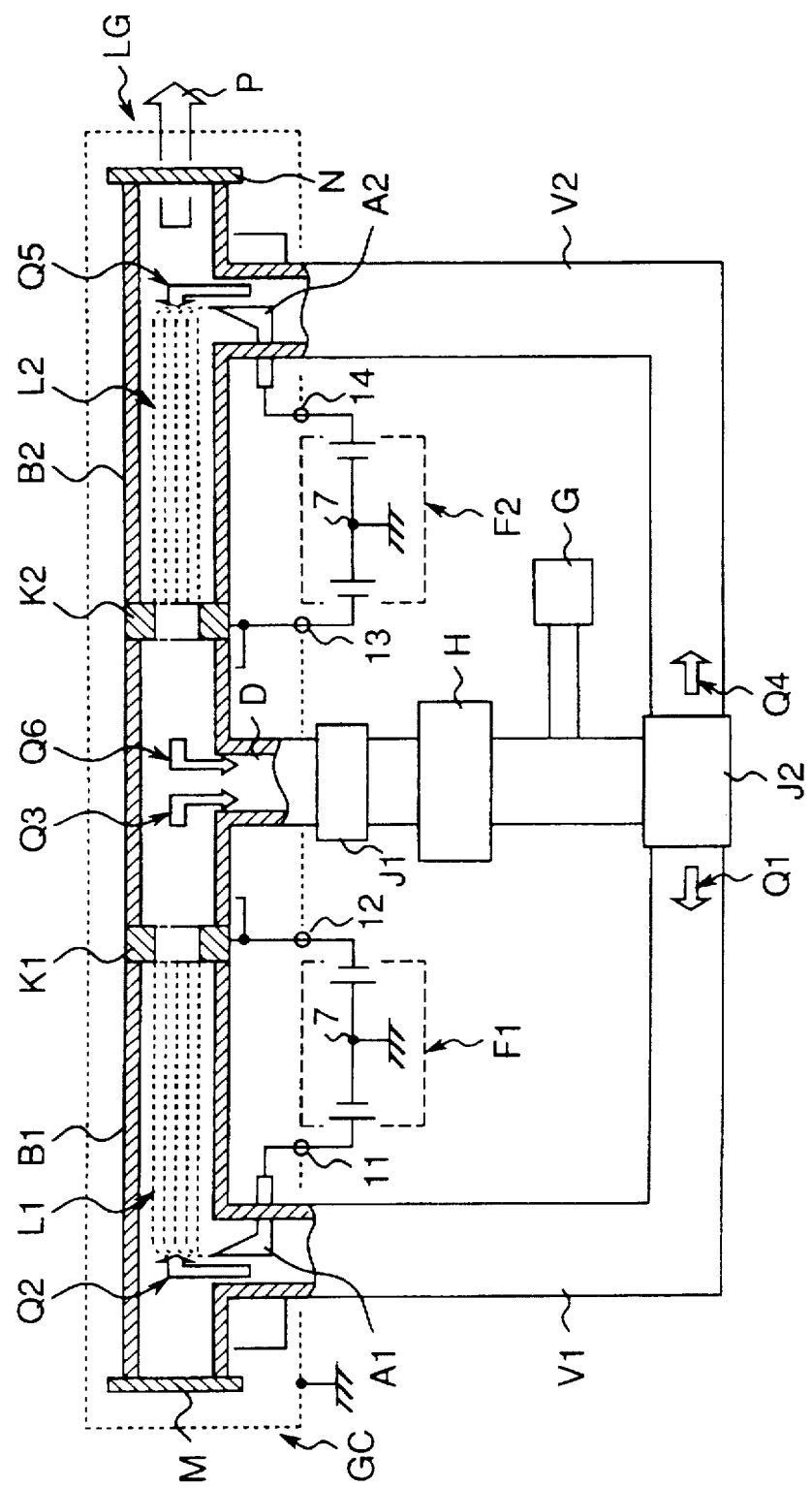
FIG. 2 is a diagram explanatory of the laser oscillation in a conventional carbon dioxide gas laser oscillation apparatus provided with a laser oscillator LG and a laser gas feed device for the laser oscillator.

Since parts of FIG. 5 represented by the same reference numerals as in FIGS. 1 and 2 function the same way as those of FIG. 1, the description will be abbreviated and different parts will be depicted here. A high voltage DC power source device for the laser oscillator in FIG. 5 is constituted of the high voltage DC power sources F1 and F2 as in FIG. 1. The constitution of the high voltage DC power source F1 will now be described by way of example.

An abnormal current detection circuit ND is connected between the ground and the zero-potential terminal 7 which is a connection point between a minus output terminal of the high voltage rectifier circuit RH1 and a plus output terminal of the high voltage rectifier circuit RH2. The abnormal current detection circuit ND detects an abnormal current flowing between the zero-potential terminal 7 and the oscillator case GC at the earthing potential, with outputting an abnormal current detection signal Nd. An abnormal discharging judgment reference signal-setting circuit NR sets a value of an abnormal discharging judgment reference signal Nr to judge whether or not the detected abnormal current causes abnormal discharging.

To an abnormal discharging-judging circuit CN are input the above abnormal current detection signal Nd and the abnormal discharging judgment reference signal Nr. When the abnormal current detection signal Nd is not smaller than the abnormal discharging judgment reference signal Nr, the abnormal discharging-judging circuit CN outputs an abnormal discharging judgment signal Cn to stop outputting from the inverter circuit INV. An inverter-controlling/judgment-stopping circuit ICN outputs an inverter-controlling/ judgment-stopping signal ICN to the inverter circuit INV upon receipt of the abnormal discharging judgment signal Cn.

The high voltage DC power source F2 is in the same constitution as the high voltage DC power source F1. A sole difference is that the discharging current value-setting circuit IR is not provided in the high voltage DC power source F2, because the circuit IR is shared between the power sources F1 and F2. The constitution and function of other circuits of the power source F2 will therefore be not described herein.

In Embodiment 3 of FIG. 5, if an mount of moisture adheres in the discharge tube B1, abnormal discharging, takes place between the anode electrode A1 and oscillator case GC at the earthing potential, between the cathode electrode K1 and oscillator case GC or elsewhere outside the discharge area L1 between the anode and cathode electrodes A1 and K1. In consequence, an abnormal discharging current starts to flow. Or, if the oscillator case GC is greatly humid thereinside, the insulation between the anode electrode A1 and oscillator case GC and between the cathode electrode K1 and oscillator case GC is turned defective, whereby a leak current is generated. The aforementioned abnormal discharging current and leak current will be referred to as an abnormal current hereinafter.

In the case where the above abnormal current flows, in Embodiment 3 of FIG. 5, the abnormal current from the anode electrode A1 to the oscillator case GC runs to the high voltage rectifier circuit RH1 or RH2 from the zero-potential terminal 7 through the oscillator case GC and abnormal current detection circuit ND. Meanwhile, the abnormal current flowing from the oscillator case GC to the cathode electrode K1 is, from the high voltage rectifier circuit RH1 or RH2, zero-potential terminal 7 and abnormal current detection circuit ND, sent back to the oscillator case GC. The abnormal current flowing to the oscillator case GC is detected by the abnormal current detection circuit ND.

Figure 6:
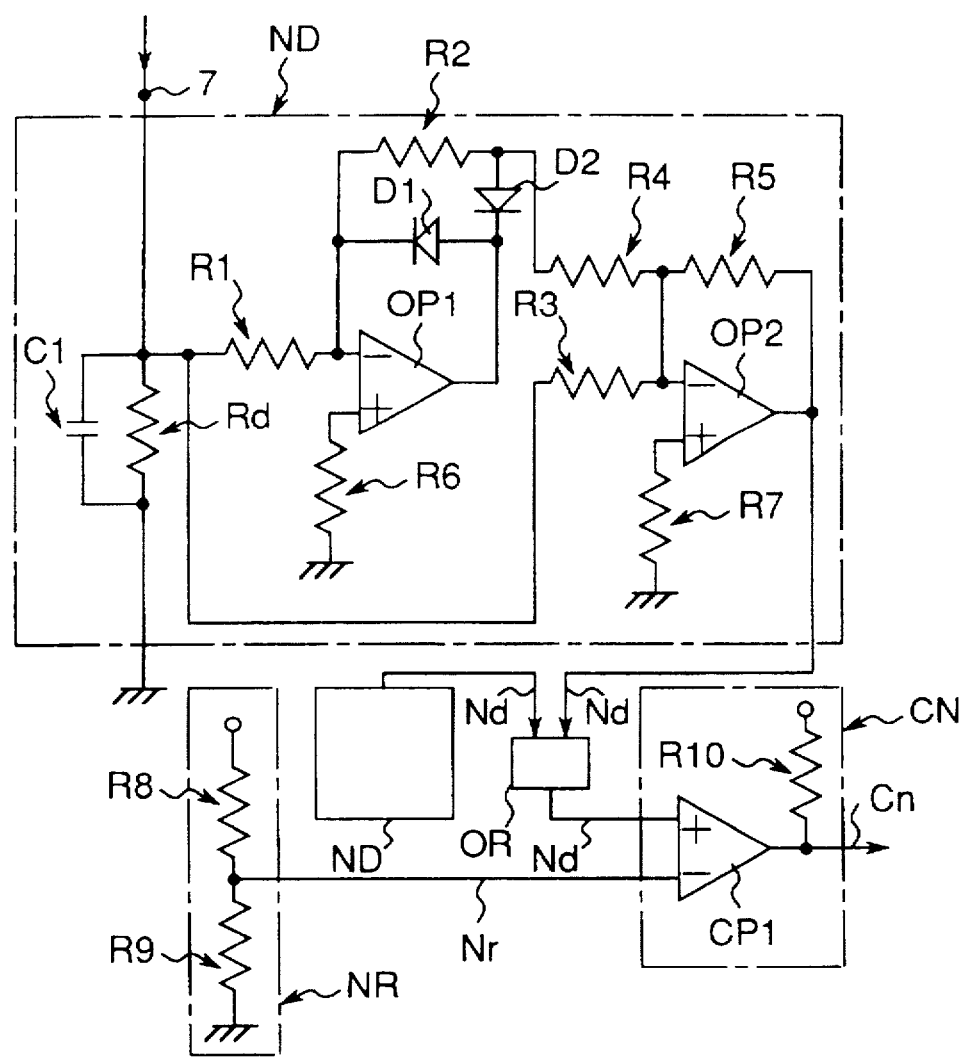
FIG. 6 is a circuit diagram of an abnormal current detection circuit ND, an abnormal discharging judgment reference signal-setting circuit NR and an abnormal discharging-judging circuit CN in one embodiment of the present invention.

FIG. 6 is a circuit diagram of an embodiment of the abnormal current detection circuit ND, abnormal discharging judgment reference signal-setting circuit NR and abnormal discharging-judging circuit CN. References Rd and R1–R10 are resistors, OP1 and OP2 are operational amplifiers, D1 and D2 are diodes, C1 is a capacitor and CP1 is a comparator in FIG. 6.

The abnormal current detection circuit ND is constituted of a full-wave rectifier circuit comprising the resistor Rd converting the abnormal current to a voltage signal, the capacitor C1, the operational amplifiers OP1 and OP2, the resistors R1–R7 and the diodes D1 and D2, etc. Supposing that resistors Rd and R1–R7 have resistances rd and r1–r7 respectively, rd<r1=r2=r3=2×r4 is held, r6 is a value of a parallel connection of r1 and r2 and, r7 is a value of a parallel connection of r3, r4 and r5. When the abnormal current runs from the anode electrode A1 to the oscillator case GC or from the oscillator case GC to the cathode electrode K1, the abnormal current flows through the resistor Rd, thereby generating a voltage at both ends of the resistor Rd.

A voltage at both ends of the resistor Rd and the capacitor Ci connected in parallel to the resistor Rd is input to the full-wave rectifier circuit consisting of the operational amplifiers OP1, OP2, etc. via the resistors R1 and R3. In consequence, the rectified abnormal current detection signal Nd is output from the operational amplifier OP2 to the abnormal discharging-judging circuit CN. A ratio of this abnormal current detection signal Nd and the voltage at both ends of the parallel-connected resistor Rd and capacitor C1 is r5/r1.

The abnormal discharging judgment reference signal-setting circuit NR divides a voltage of a DC power source (not shown) by the resistors R8 and R9, thereby outputting the abnormal discharging judgment reference signal Nr.

The abnormal discharging-judging circuit CN is constituted of the comparator CP1 and the resistor R10, to which the abnormal current detection signal Nd output from the abnormal current detection circuit ND and the abnormal discharging judgment reference signal Nr output from the abnormal discharging, judgment reference signal-setting circuit NR are input. If the abnormal current detection signal Nd is larger than the abnormal discharging judgment reference signal Nr, the abnormal discharging-judging circuit CN outputs the abnormal discharging judgment signal Cn to stop outputting by the inverter circuit INV.

The abnormal discharging judgment signal Cn stops outputs from the inverter circuit INV when a value of the abnormal current detection signal Nd exceeds a value of the abnormal discharging judgment reference signal Nr. The discharge tubes can hence be prevented from being damaged by the abnormal discharging, and also parts of the device are prevented from being damaged by the abnormal discharging current or leak current. Further, if a measuring instrument, a monitor device or the like is connected to the carbon dioxide gas laser oscillation apparatus, influences of noises to these instruments can be prevented.

Although the inverter circuit is utilized as the high voltage DC power source in the foregoing Embodiment, the present invention is not restricted to the above idea, and any high voltage DC power source device for a laser oscillator having a plus terminal, a minus terminal and a zero-potential terminal will do.

[Embodiment 4]

Figure 7:
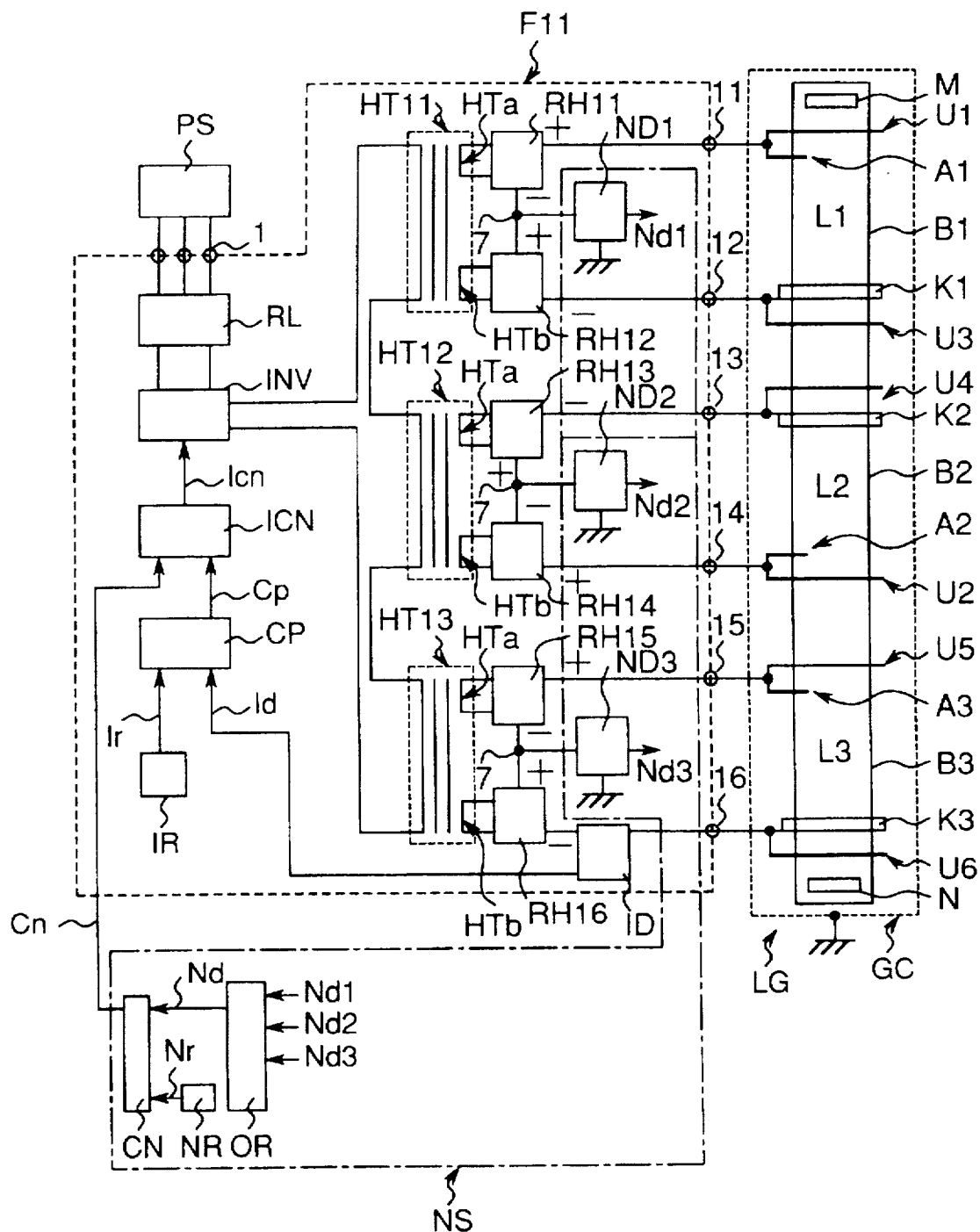
FIG. 7 is a diagram of a carbon dioxide gas laser oscillation apparatus according to a fourth embodiment of the present invention, which is provided with a laser oscillator LG with belt-like abnormal discharging prevention conductors, an abnormal discharging-judging/output-stopping circuit NS and a high voltage DC power source F11 consisting of one inverter and three high voltage transformers connected in series to the inverter.

FIG. 7 is a diagram of Embodiment 4 of the present invention, wherein the carbon dioxide gas laser oscillation apparatus is provided with the laser oscillator LG with band-shaped conductors for prevention of abnormal discharging, the abnormal discharging-judging/output-stopping circuit NS and the high voltage DC power source F11 having three high voltage transformers connected in series to one inverter.

The carbon dioxide gas laser oscillation apparatus of FIG. 7 is constituted of the laser oscillator LG having abnormal discharging prevention conductors U1–U6 each formed like a band, the abnormal discharging-judging/output-stopping circuit NS and the high voltage DC power source F11 with three high voltage transformers HT11–HT13 connected in series to one inverter INV.

In the drawing, since parts of the same reference numerals as in FIG. 5 function the same way, the description of the parts will be abbreviated here and differences will be discussed below.

The carbon dioxide gas laser oscillation apparatus in FIG. 7 includes discharge tubes B1–B3 having the high voltage DC power source F11 connected between each pair of the anode and cathode electrodes A1–A3 and K1–K3. The carbon dioxide gas laser oscillation apparatus is provided with conductors U1–U6 arranged near one or both of the non-grounded electrodes in pairs in the outer periphery of the discharge tubes except intervals of the pairs of electrodes, and connected to the non-grounded electrodes, the low voltage rectifier circuit RL for rectifying/smoothing an input from a commercial power source, one inverter circuit INV for converting an output of the low voltage rectifier circuit RL to an AC, high voltage transformers HT11–HT13 of the same count as that of the discharge tubes B1–B3, high voltage rectifier circuits RH11–RH16 connecting primary sides of the plurality of high voltage transformers HT11–HT13 in series to the inverter circuit INV, rectifying and connecting outputs of the secondary sides of the high voltage transformers HT11–HT13 to the plurality of discharge tubes B1–B3, and abnormal current detection circuits ND1–ND3 connected between earthing terminals and zero-potential terminals 7 of the high voltage rectifier circuits RH11–RH16 each having a plus output terminal, a minus output terminal and the zero-potential terminal 7. The abnormal discharging-judging circuit CN outputs the abnormal discharging judgment signal, namely, operation stopping signal Cn to the inverter circuit INV when one of the detected signals Nd1–Nd3 of the abnormal current detection circuits ND1–ND3 exceeds the abnormal discharging judgment reference signal Nr.

In addition to the conductors U1–U4 as in FIG. 5, band-shaped conductors U5 and U6 are fixed in FIG. 7. The conductors U5 and U6 are connected respectively to the anode electrode A3 and cathode electrode K3 in the outer periphery of the discharge tube B3 near the anode electrode A3 and cathode electrode K3 except an interval of the pair of the anode electrode A3 and cathode electrode K3.

One low voltage rectifier circuit RL, one inverter circuit INV, one discharging current value detection circuit ID, one discharging current value comparison circuit CP and one inverter control circuit IC or one inverter-controlling/judgment-stopping circuit ICN are set for each of the high voltage DC power sources F1 and F2 in FIG. 5. However, in Embodiment 4 shown in FIG. 7, every one circuit is installed for the high voltage DC power source F11.

Although the high voltage output from the inverter circuit INV is supplied only to one high voltage transformer HT in FIGS. 1 and 5, the high voltage is fed to three high voltage transformers HT11–HT13 connected in series in the embodiment of FIG. 7.

According to Embodiment 4 in FIG. 7, outputs of secondary windings HTa and HTb of each high voltage transformer HT11–HT13 are connected to high voltage rectifier circuits RH11–RH16. Plus output terminals 11, 14 and 15 of the highs voltage rectifier circuits RH11, RH14 and RH15 are connected to the anode electrodes A1–A3, respectively. And, minus output terminals of the high voltage rectifier circuits RH12, RH13 and RH16 are connected to the cathode electrodes K1–K3, respectively. The discharging current value detection circuit ID is connected between the minus output terminal of the circuit RH16 and minus output terminal 16 of the power source F11.

The connection point (zero-potential terminal) 7 between the minus output terminal of the high voltage rectifier circuit RH11 and plus output terminal of the high voltage rectifier circuit RH12 is connected to the abnormal current detection circuit ND1. In the same manner, the connection point (zero-potential terminal) 7 between the plus output terminal of the circuit RH13 and minus output terminal of the circuit RH14 is connected to the abnormal current detection circuit ND2, and the connection point (zero-potential terminal) 7 between the minus output terminal of the circuit RH15 and plus output terminal of the circuit RH16 is connected to the abnormal current detection circuit ND3.

The abnormal current detection signals Nd1–Nd3 output from the abnormal current detection circuits ND1–ND3 are, through an OR circuit OR, output to the abnormal discharging-judging circuit CN. The abnormal discharging judgment reference signal-setting circuit NR outputs the abnormal discharging judgment reference signal Nr to judge whether or not abnormal discharging is generated by the detected abnormal current. The abnormal discharging-judging circuit CN outputs the abnormal discharging judgment signal Cn when the abnormal discharging detection signal Nd input thereto is larger than the abnormal discharging judgment reference signal Nr received from the circuit NR. The inverter controlling/judgment-stopping circuit ICN, when receiving an input of the abnormal discharging judgment signal Cn, outputs the inverter controlling/judgment-stopping signal Icn to the inverter circuit INV.

The function of other circuits is the same as in FIG. 1, and therefore not described here.

[Embodiment 5]

Figure 8:
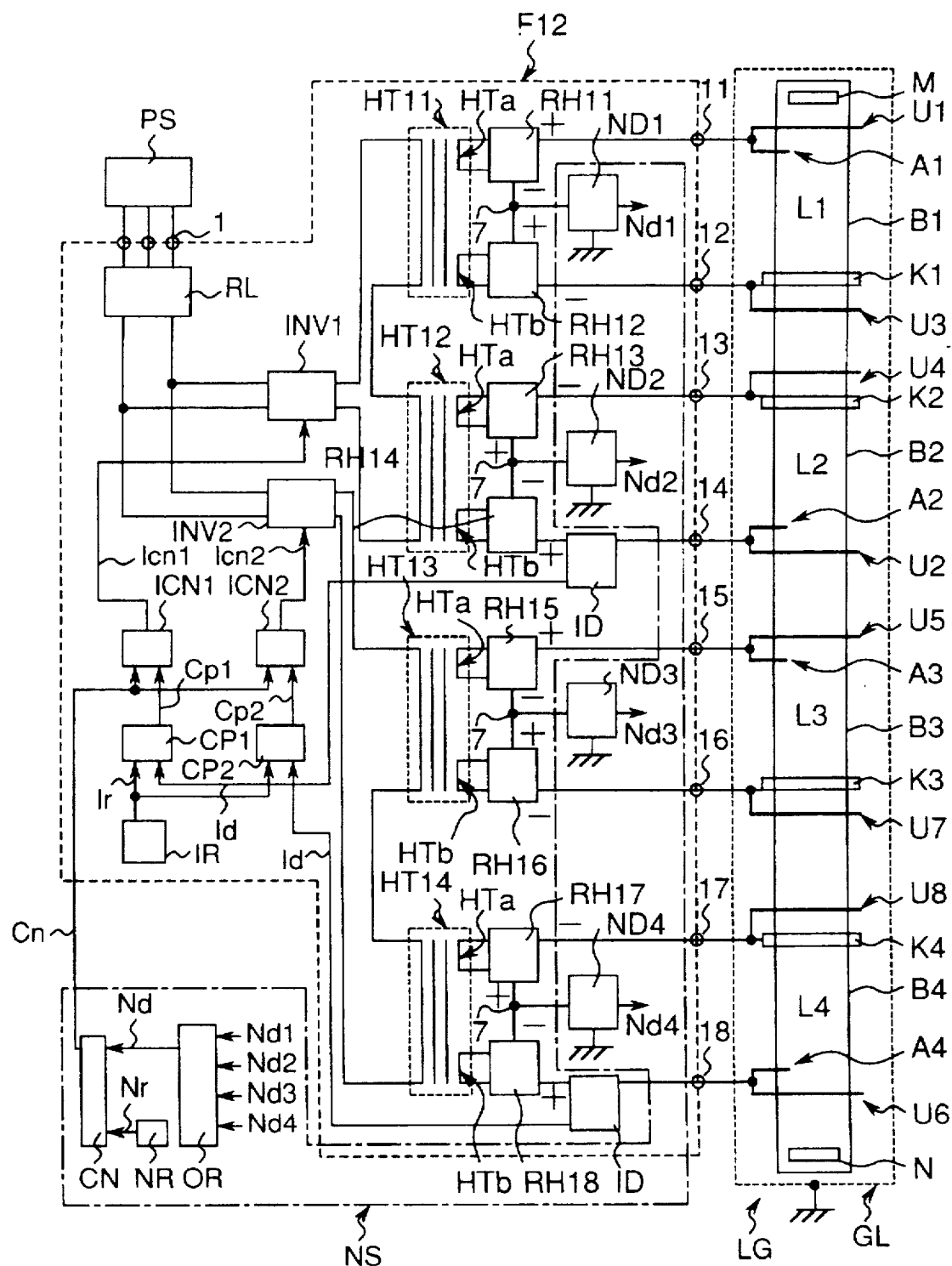
FIG. 8 is a diagram of a carbon dioxide gas laser oscillation apparatus according to a fifth embodiment of the present invention, which is provided with a laser oscillator LG with belt-like abnormal discharging prevention conductors, an abnormal discharging-judging/output-stopping circuit NS and a high voltage DC power source F12 wherein each of two inverters is connected in series to two high voltage transformers.

FIG. 8 shows Embodiment 5 of the present invention, i.e., a carbon gas laser oscillation apparatus provided with the laser oscillator LG with band-like conductors for prevention of abnormal discharging, the abnormal discharging-judging/output-stopping circuit NS and the high voltage power source F12 having two inverters each connected in series to two high voltage transformers.

The carbon dioxide gas laser oscillation apparatus of FIG. 8 is constituted of the laser oscillator LG having band-shaped abnormal discharging prevention conductors U1–U8, abnormal discharging-judging/output-stopping circuit NS and high voltage DC power source F12 having two inverters INV1 and INV2. Two high voltage transformers HT11 and HT12 are connected in series to one inverter INV1, while high voltage transformers HT13 and HT14 are connected in series to the other inverter INV2.

Parts represented by the same reference numerals in FIG. 8 as in FIG. 5 function in the same way, and therefore the description of the parts will be abbreviated and only different parts will be depicted here.

In each discharge tube B1–B4 of the carbon dioxide gas laser oscillation apparatus of FIG. 8, the high voltage DC power source F12 is connected between a pair of the anode electrode A1–A4 and cathode electrode K1–K4. The carbon dioxide gas laser oscillation apparatus is provided with conductors U1–U8 connected to one or both of non-grounded electrodes in each pair near the discharge tubes and in the outer periphery of the discharge tubes except the intervals of the pairs of the electrodes, the low voltage rectifier circuit RL for rectifying/smoothing an input from a commercial power source, two inverter circuits INV1 and INV2 for converting an output of the low voltage rectifier circuit RL to an AC, high voltage transformers HT11–HT14 of the same count as that of the discharge tubes B1–B4, high voltage rectifier circuits RX11–RH18 which divide the plurality of high voltage transformers HT11–HT14 into groups of the same count as that of the inverter circuits, connect primary sides of the high voltage transformers HT11 and HT12 of the divided group in series to primary sides of the high voltage transformers HT13 and HT14, connect the series-connected primary sides to the inverter circuits INV1 and INV2, rectify outputs of the secondary sides of the high voltage transformers HT11–HT14 and feed to the plurality of discharge tubes B1–B4, and abnormal current detection circuits ND1–ND4 connected between the earthing terminals and zero-potential terminals 7 of the high voltage rectifier circuits RH11–RH18 each having a plus output terminal, a minus output terminal and the zero-potential terminal 7. The abnormal discharging-judging circuit CN outputs the operation stopping signal Cn to the inverter circuits INV1 and INV2 when one of the signals Nd1–Nd4 of the abnormal current detection circuits ND1–ND4 exceeds the abnormal discharging judgment reference signal Nr.

Besides the band-shaped conductors U1–U4 set in FIG. 5, the oscillation device in Embodiment 5 has band-shaped conductors U5 and U7 fixedly connected to the anode electrode A3 and cathode electrode K3, respectively, in the outer periphery of the discharge tube B3 near the anode electrode A3 and cathode electrode K3 except the interval of the pair of the anode electrode A3 and cathode electrode K3. Similarly, band-shaped conductors U6 and U8 are fixed and connected to the anode electrode A4 and cathode electrode K4 in the outer periphery of the discharge tube B4 near the anode electrode A4 and cathode electrode K4 except an interval of a pair of the anode and cathode electrodes A4 and K4.

According to Embodiment 5 of FIG. 8, two inverter circuits INV1 and INV2 are installed in the high voltage DC power source F12. Every one inverter circuit has the discharging current value detection circuit ID, discharging current value comparison circuit CP and inverter controlling/judgment-stopping circuit ICN.

In FIGS. 1 and 5, the high voltage output from the inverter circuit INV is fed only to the high voltage transformer HT. On the other hand, in FIG. 8, the high voltage output at the inverter circuit INV1 is supplied to two high voltage transformers HT11 and HT12 connected in series, and the high voltage output from the inverter circuit INV2 is supplied to the high voltage transformers HT13 and HT14 connected in series.

In the embodiment shown in FIG. 8, outputs of the secondary windings HTa and HTb of each high voltage transformer HT11–HT14 are connected to high voltage rectifier circuits RH11–RH18. Plus output terminals 11, 14, 15 and 18 of these high voltage rectifier circuits RH11, RH14, RH15 and RH18 are connected to the anode electrodes A1–A4. Moreover, minus output terminals 12, 13, 16 and 17 of the high voltage rectifier circuits RH12, RH13, RH16 and RH17 are connected to cathode electrodes K1–K4. The discharging current value detection circuit ID is connected between the minus output terminal of the circuit RH18 and the minus output terminal 18 of the high voltage DC power source F12.

The connection point (zero-potential terminal) 7 of the minus output terminal of the high voltage rectifier circuit RH11 and plus output terminal of the circuit RH12 is connected to the abnormal current detection circuit ND1. In the same fashion, the connection point (zero-potential terminal) 7 between the plus output terminal of the high voltage rectifier circuit RH13 and minus output terminal of the circuit RH14 is connected to the abnormal current detection circuit ND2.

The connection point (zero-potential terminal) 7 between the minus output terminal of the high voltage rectifier circuit RH15 and the plus output terminal of the circuit RH16 is connected to the abnormal current detection circuit ND3. The connection point (zero-potential terminal) 7 between the plus output terminal of the high voltage rectifier circuit RH17 and the minus output terminal of the circuit RH18 is connected to the abnormal current detection circuit ND4.

The abnormal current detection signals Nd1–Nd4 output by the abnormal current detection circuits ND1–ND4 are output to the abnormal discharging-judging circuit CN through the OR circuit OR.

The abnormal discharging judgment reference signal-setting circuit NR outputs the abnormal discharging judgment reference signal Nr to decide whether or not abnormal discharging is brought about by the detected abnormal current. The abnormal discharging-judging circuit CN generates, having inputs of the abnormal current detection signal Nd and the abnormal discharging judgment reference signal Nr, the abnormal discharging judgment signal Cn when the abnormal current detection signal is larger than the reference signal.

The inverter-controlling/judgment-stopping circuits ICN1 and ICN2 output inverter-controlling/judgment-stopping signals ICN1 and ICN2 to the inverter circuits INV1 and INV2 upon receipt of the abnormal discharging judgment signal Cn.

The function of other circuits are the same as in FIG. 1 and therefore the description will be abbreviated here.

Owing to the effect common to claims 1–7, since conductors are connected to one or both of non-grounded electrodes in each pair in the outer periphery of the discharge tube near the non-grounded electrode except the interval of the pairing electrodes, an inclination of the potential of the non-grounded anode or cathode electrode in the vicinity outside of the discharge area is reduced, thereby to prevent the generation of abnormal discharging between the non-grounded electrode and metal fittings of the reflecting mirror, between the non-grounded electrode and metal fittings of the output mirror or between the non-grounded electrode and heat exchanger. The distance of the electrode and metal fittings, etc. can thus be shortened, whereby the carbon dioxide gas laser oscillation apparatus is rendered compact. Since the generation of abnormal discharging not related to the laser oscillation is prevented, the maximum laser output is increased in comparison with the prior arts. Moreover, damages of parts consequent to the abnormal discharging can be avoided.

The effect of claims 2 and 3 prevents, in addition to the effect of claim 1, instable laser outputs even if an abnormal discharging current, a leak current or the like flows, because an abnormal current such as the abnormal discharging current generated between the anode electrode A1 and the oscillator case GC at the earthing potential, abnormal discharging current between the cathode electrode K1 and oscillator case GC, or the leak current flowing in the oscillator case GC, etc. is detected and the high voltage DC power source is stopped when a detected value of the abnormal current exceeds an abnormal discharging judgment reference value. Since parts of the device are consumed regularly in accordance with the lapse of using time, an inspection timing for the device is surely and clearly predicted. Parts are protected against damages by the abnormal discharging current or leak current, therefore enjoying a long life. Even when a measuring instrument or a monitor device or the like is connected to the carbon dioxide gas laser oscillation apparatus, influences of noises to these instruments can be prevented.

According to the effect of claim 4, in addition to the effect of claim 1, one inverter control circuit ICN is enough to control the inverter circuit INV, because electricity is supplied to a plurality of discharge tubes by the one inverter circuit. As compared with the prior arts, a count of parts is greatly reduced, so that the power source for the carbon dioxide gas laser oscillator is made compact and cost-saving.

According to the effect of claim 5, in addition to the effect of claim 1, each inverter circuit feeds electricity to a plurality of discharge tubes and therefore a count of circuits in the inverter-controlling/judgment-stopping circuit ICN or ICN1 ICN2 controlling the inverter circuits INV or INV1 and INV2 is reduced. A count of parts is consequently reduced greatly in comparison with the prior arts. If the invention is applied to a plurality of inverter circuits, the capacity is increased and the power source even for a carbon dioxide gas laser oscillator of a large capacity is rendered compact and cost-saving.

The effect achieved by claim 6 includes effects of claims 2 and 4 in addition to that of claim 1.

The effect of claim 7 includes effects of claims 2 and 5 in addition to that of claim 1.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A carbon dioxide gas laser oscillation apparatus having
   a discharge tube having a pair of anode and cathode electrodes at least one of which is non-grounded,
   a high voltage DC power source connected between said pair of electrodes, and
   at least one conductor being arranged on said discharge tube in the vicinity of the non-grounded electrode of said pair of electrodes but on one side of the non-grounded electrode opposite to a space between said pair of electrodes.

2. The carbon dioxide gas laser oscillation apparatus according to claim 1, wherein said high voltage DC power source, with having an input from a commercial power source, has a plus output terminal, a minus output terminal, a zero-potential terminal in the middle between said plus and minus output terminals and a ground terminal and said carbon dioxide gas laser oscillation apparatus further comprises
   an abnormal current detection circuit connected between said zero-potential terminal and ground terminal, and
   an abnormal discharging-judging circuit for outputting a stop signal to said high voltage DC power source when the current detected by said abnormal current detection circuit exceeds a reference value predetermined for discriminating an abnormal discharge in said discharge tube.

3. The carbon dioxide gas laser oscillation apparatus according to claim 2, wherein said high voltage DC power source comprises
   a low voltage rectifier circuit for rectifying/smoothing a current input from said commercial power source,
   an inverter circuit for converting an output of said low voltage rectifier circuit to a high frequency AC,
   a high voltage transformer for transforming an output voltage of said inverter circuit to a high voltage, and
   a high voltage rectifier circuit for rectifying an output of said high voltage transformer and supplying a rectified output between said plus output terminal and said zero-potential terminal and between said minus output terminal and said zero-potential terminal.

4. A carbon dioxide gas laser oscillation apparatus comprising
   a plurality of discharge tubes connected in series in an axial direction thereof, each of which has a pair of anode and cathode electrodes at least one of which is non-grounded,
   a plurality of high voltage DC power sources each connected between said pair of electrodes of each discharge tube,
   conductors each being arranged on said each discharge tube in the vicinity of the non-grounded electrode of said pair of electrodes but on one side of the non-grounded electrode opposite to a space between said pair of electrodes,
   a low voltage rectifier circuit for rectifying/smoothing an input from a commercial power source,
   an inverter circuit for converting an output of said low voltage rectifier circuit into AC,
   high voltage transformers of the same count as that of said plurality of discharge tubes, primary sides of said high voltage transformers are connected in series to said inverter, and
   high voltage rectifier circuits each of which rectifies an output of the secondary side of each high voltage transformer to apply the rectified output to each discharge tube.

5. The carbon dioxide gas laser oscillation apparatus according to claim 4, wherein each of said plurality of high voltage DC power sources has a plus output terminal, a minus output terminal, a zero-potential terminal at a middle point between said plus and minus output terminals and a ground terminal and said oscillation apparatus comprises a current detection circuit connected between said zero-potential terminal and ground terminal and an abnormal discharging-judging circuit which outputs a stop signal to said high voltage DC power source when a current detected by said current detection circuit exceeds a reference value predetermined for discriminating an abnormal discharge in each discharge tube.

6. A carbon dioxide gas laser oscillation apparatus comprising
   a plurality of discharge tubes connected in series in an axial direction thereof, each of which has a pair of anode and cathode electrodes at least one of which is non-grounded,
   a plurality of high voltage DC power sources, each being connected between said pair of electrodes of each discharge tube,
   conductors each being arranged on said each discharge tube in the vicinity of the non-grounded electrode of said pair of electrodes but on one side of the non-grounded electrode opposite to a space between said pair of electrodes,
   a low voltage rectifier circuit for rectifying/smoothing an input from a commercial power source,
   a plurality of inverter circuits for converting an output of said low voltage rectifier into an AC,
   high voltage transformers of the same count as that of said plurality of discharge tubes, said voltage transformers being grouped into groups of the same count as that of said plurality of inverter circuits, primary sides of high voltage transformers belonging to one of the groups being connected in series to one of said plurality of inverter circuits, and a plurality of high voltage rectifier circuits each rectifying an output from the secondary side of each high voltage transformer to supply the rectified output to the corresponding one of said plurality of discharge tubes.

7. The carbon dioxide gas laser oscillation apparatus according to claim 6, wherein each of said high voltage rectifier circuits has a plus output terminal, a minus output terminal, a zero-potential terminal and a ground terminal at a middle point between said plus and minus output terminals and said gas laser oscillation apparatus comprises a plurality of abnormal current detection circuits each connected between said zero-potential terminal and a ground terminal of each of said high voltage rectifier circuits and a plurality of abnormal discharging-judging circuits each outputting a stop signal to corresponding one of said plurality of high voltage DC power sources when a current detected by said current detection circuit exceeds a reference value predetermined for discriminating an abnormal discharge in each discharge tube.

* * * * *